(12) United States Patent
Hahn et al.

(10) Patent No.: US 12,393,372 B2
(45) Date of Patent: *Aug. 19, 2025

(54) DATA STORAGE DEVICE AND METHOD FOR DEVICE-INITIATED HIBERNATION

(71) Applicant: Sandisk Technologies, Inc., Milpitas, CA (US)

(72) Inventors: Judah Gamliel Hahn, Ofra (IL); Ariel Navon, Revava (IL); Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/760,409

(22) Filed: Jul. 1, 2024

(65) Prior Publication Data

US 2024/0354033 A1    Oct. 24, 2024

Related U.S. Application Data

(62) Division of application No. 17/752,305, filed on May 24, 2022, now Pat. No. 12,045,508.

(51) Int. Cl.
*G06F 3/06* (2006.01)

(52) U.S. Cl.
CPC .......... *G06F 3/0659* (2013.01); *G06F 3/0607* (2013.01); *G06F 3/0656* (2013.01); *G06F 3/0679* (2013.01)

(58) Field of Classification Search
CPC ...... G06F 3/067; G06F 3/0619; G06F 3/0656; G06F 3/0659; G06F 3/0679
See application file for complete search history.

(56) References Cited

U.S. PATENT DOCUMENTS

| | | | | |
|---|---|---|---|---|
| 5,974,544 | A | * | 10/1999 | Jeffries .............. G06F 11/1092 714/E11.088 |
| 6,327,671 | B1 | * | 12/2001 | Menon ............... G06F 11/2071 711/100 |
| 9,495,173 | B2 | | 11/2016 | Bar-Or |
| 11,656,798 | B1 | * | 5/2023 | Benisty ................ G06F 3/0659 711/154 |
| 2008/0162918 | A1 | | 7/2008 | Muurinen |
| 2010/0106886 | A1 | | 4/2010 | Marcu |
| 2011/0231595 | A1 | | 9/2011 | Wakrat |
| 2012/0221875 | A1 | | 8/2012 | Bak |

(Continued)

*Primary Examiner* — Aracelis Ruiz
(74) *Attorney, Agent, or Firm* — Crowell & Moring LLP

(57) ABSTRACT

A data storage device and method for device-initiated hibernation are provided. In one embodiment, the data storage device comprises a non-volatile memory and a controller. The controller is configured to: receive, from a host during a set-up phase of a hibernation process, a plurality of write commands with a current state of a volatile memory in the host; store the plurality of write commands in a queue, wherein the plurality of write commands are not executed during the set-up phase of the hibernation process; receive a trigger from the host to perform an execution phase of the hibernation process; and in response to receiving the trigger, execute the plurality of write commands to store the current state of the host's volatile memory in the non-volatile memory of the data storage device. Other embodiments are possible, and each of the embodiments can be used alone or together in combination.

20 Claims, 8 Drawing Sheets

(56) References Cited

U.S. PATENT DOCUMENTS

| | | | |
|---|---|---|---|
| 2013/0031388 A1 | 1/2013 | Sakarda | |
| 2016/0283116 A1* | 9/2016 | Ramalingam | G06F 13/16 |
| 2017/0212793 A1 | 7/2017 | Choi | |
| 2018/0018101 A1* | 1/2018 | Benisty | G06F 3/0659 |
| 2019/0227618 A1 | 7/2019 | Huang | |
| 2019/0325919 A1 | 10/2019 | Bhargava | |
| 2020/0117599 A1 | 4/2020 | Golov | |
| 2022/0382475 A1* | 12/2022 | Lim | G06F 3/0644 |
| 2023/0205429 A1* | 6/2023 | Yang | H02J 7/0063 |

* cited by examiner

DATA STORAGE DEVICE AND METHOD FOR DEVICE-INITIATED HIBERNATION

CROSS-REFERENCE TO RELATED APPLICATION

This application is a divisional of U.S. patent application Ser. No. 17/752,305, filed May 24, 2022, which is hereby incorporated by reference herein.

BACKGROUND

Some consumer host platforms include a hibernate feature that commits the entire system state of the host to a non-volatile memory in a data storage device. The system state can be read from the data storage device later when the host wakes up. The feature works by writing all of the host system memory to a file in the data storage device (the hibernate phase) and then reading that file back into the host system memory (the resume phase), allowing user activity to continue from the point of hibernation. FIG. 7 is a diagram of a prior art Linux hibernate/resume process.

DETAILED DESCRIPTION

Overview

Figure 1A:
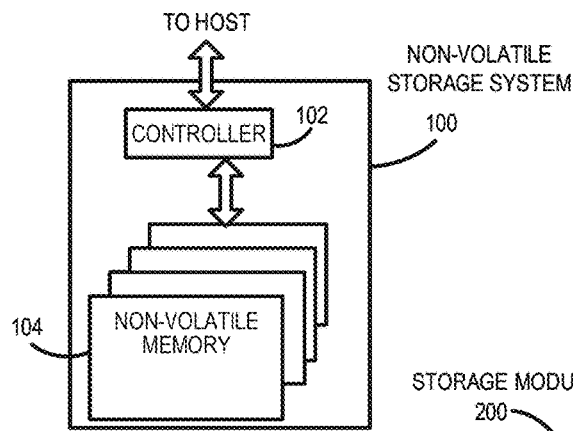
FIG. 1A is a block diagram of a data storage device of an embodiment.

By way of introduction, the below embodiments relate to a data storage device and method for device-initiated hibernation. In one embodiment, a data storage device is provided comprising a non-volatile memory and a controller. The controller is configured to receive, from a host during a set-up phase of a hibernation process, a plurality of write commands with a current state of a volatile memory in the host; store the plurality of write commands in a queue, wherein the plurality of write commands are not executed during the set-up phase of the hibernation process; receive a trigger from the host to perform an execution phase of the hibernation process; and in response to receiving the trigger, execute the plurality of write commands to store the current state of the host's volatile memory in the non-volatile memory of the data storage device.

In some embodiments, the queue comprises a controller memory buffer (CMB).

In some embodiments, the controller is further configured to send a single completion interrupt back to the host in response to the plurality of write commands having been executed, rather than sending an individual completion interrupt after each of the plurality of write commands has been completed.

In some embodiments, the controller is further configured to store an indicator in a completion queue to indicate that the plurality of write commands have been executed.

In some embodiments, the controller is further configured to inform the host that the plurality of write commands have been executed using a sideband signal.

In some embodiments, the trigger comprises a command from the host.

In some embodiments, the trigger is provided in a sideband signal from the host.

In some embodiments, the trigger is provided in a power loss notification (PLN) signal.

In some embodiments, the trigger comprises a doorbell.

In some embodiments, the trigger comprises a pre-determined sequence of commands.

In some embodiments, the controller is further configured to compress the plurality of write commands into a single command that is logically equivalent to the plurality of write commands.

In some embodiments, the controller is further configured to encrypt a data payload of each of the plurality of write commands on a per-command basis using a key-per input-output (IO) process.

In some embodiments, the non-volatile memory comprises a three-dimensional memory.

In another embodiment, a method is provided that is performed in a host in communication with a data storage device. The method comprises: mapping regions in the host's volatile memory to a plurality of sequential write commands; causing the plurality of sequential write commands to be queued in the data storage device, wherein data in the plurality of sequential write commands is compressed; and instructing the data storage device to execute the plurality of sequential write commands stored in the queue.

In some embodiments, a sequential range of the plurality of sequential write commands exceeds a maximum data transfer size of the data storage device.

In some embodiments, the method further comprises receiving an indication from the data storage device that the plurality of sequential write commands have been executed.

In some embodiments, the indication is provided in a completion queue.

In some embodiments, the indication is provided in a sideband signal.

In some embodiments, the data storage device is instructed via a command, a sideband signal, a power loss notification (PLN) signal, a doorbell, or a pre-determined sequence of commands.

In another embodiment, a data storage device is provided comprising a non-volatile memory; means for queuing a plurality of write commands during a set-up phase of a host hibernation process, wherein the plurality of write commands comprise a snapshot of host system memory; and means for performing an execution phase of the hibernation process to store the snapshot of host system memory in the non-volatile memory in response to an instruction from the host.

Other embodiments are possible, and each of the embodiments can be used alone or together in combination. Accordingly, various embodiments will now be described with reference to the attached drawings.

EMBODIMENTS

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1B:
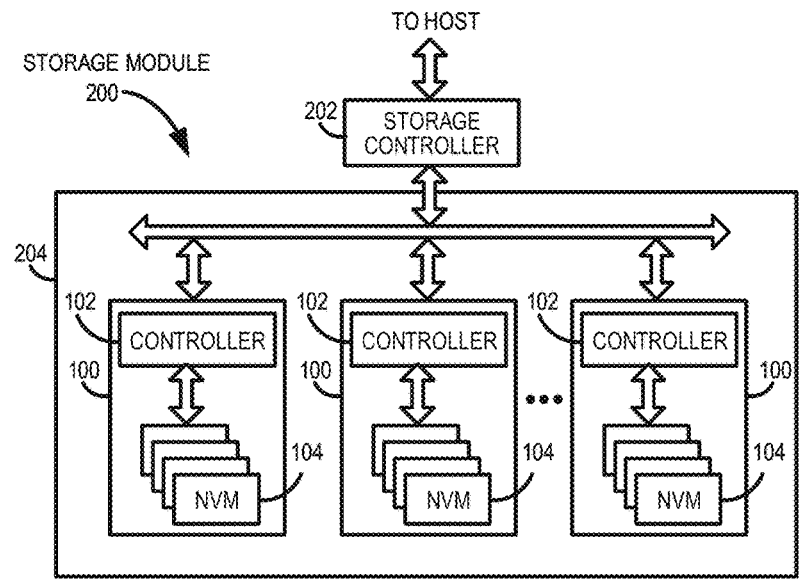
FIG. 1B is a block diagram illustrating a storage module of an embodiment.
Figure 1C:
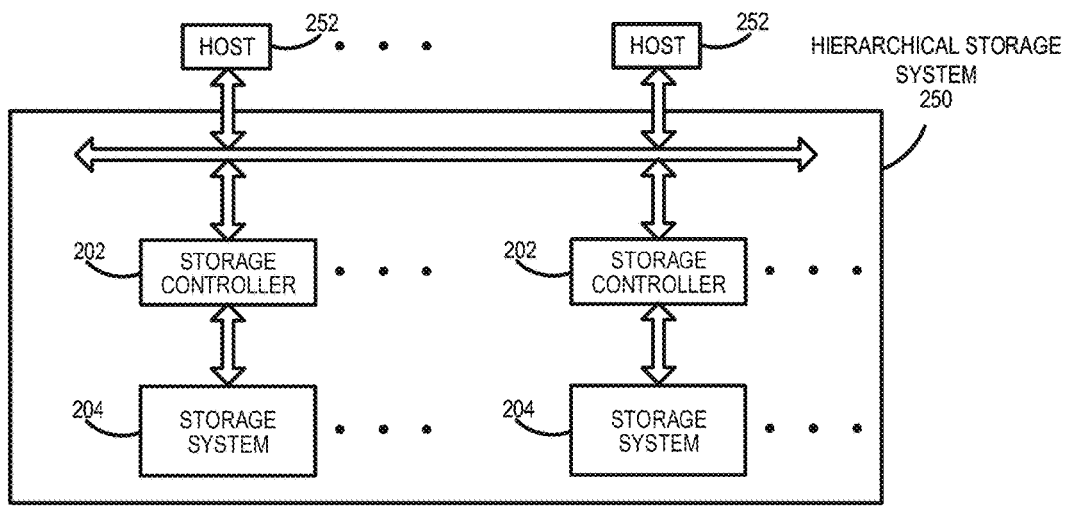
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro) processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), quad-level cells (QLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
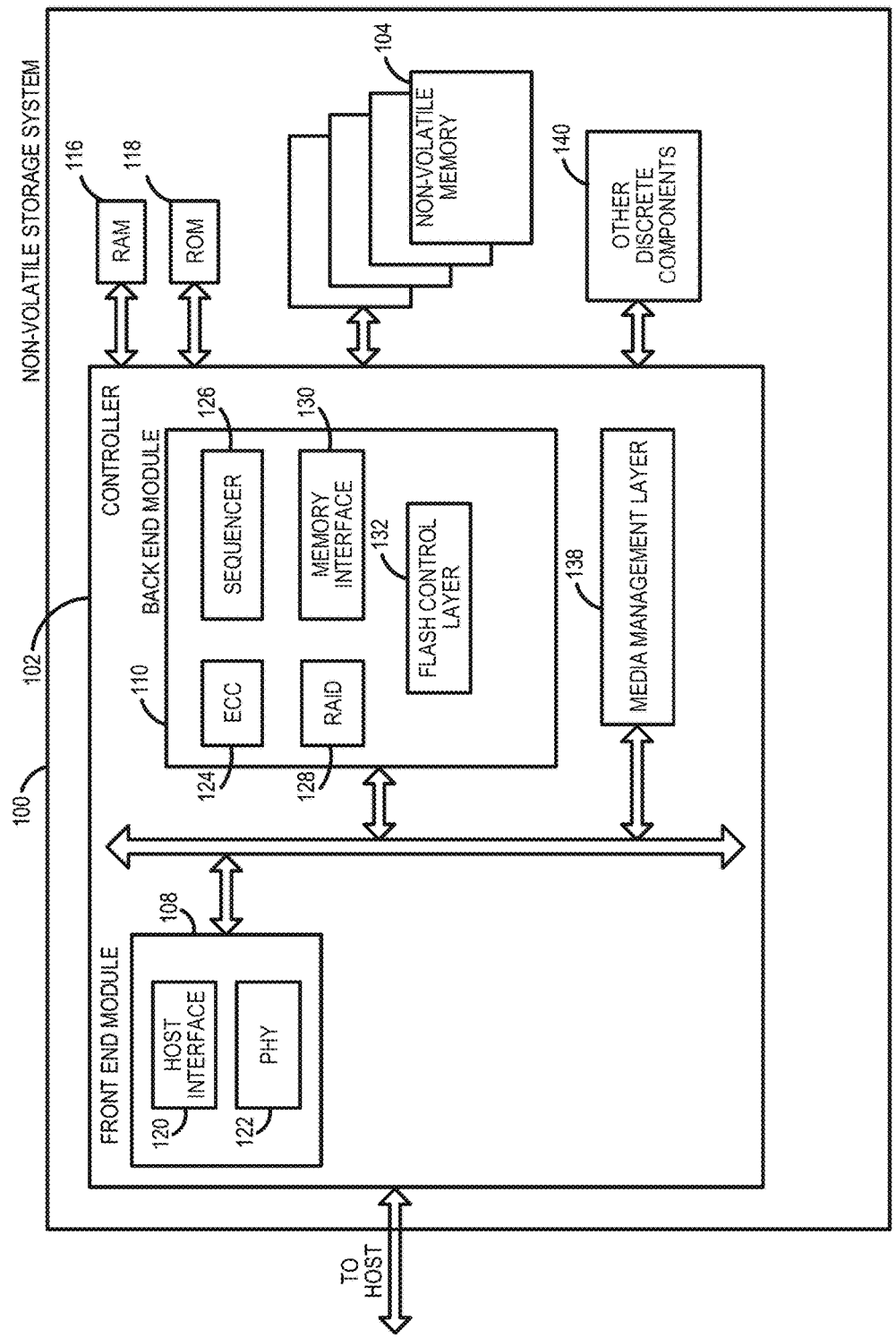
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro) processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
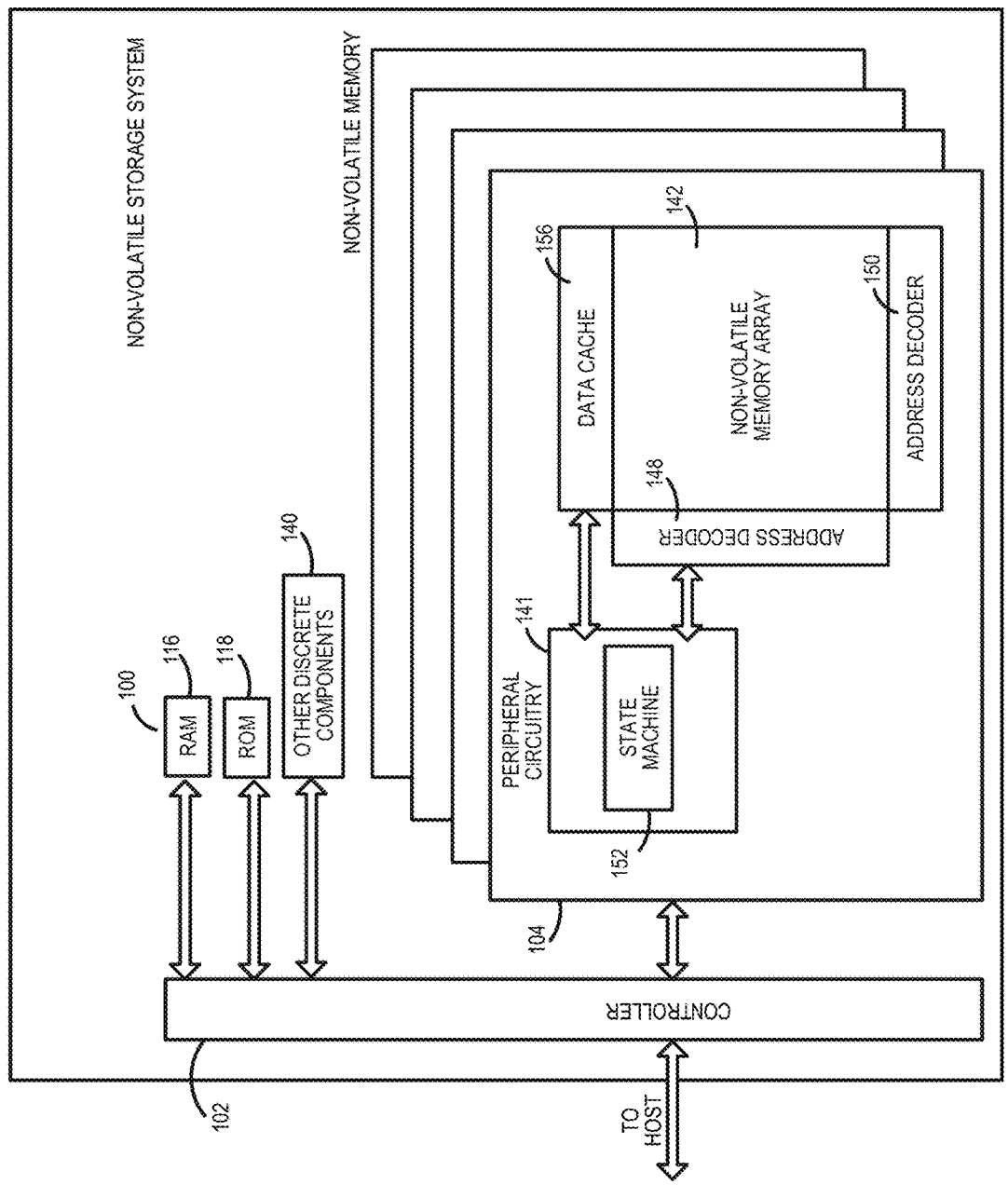
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
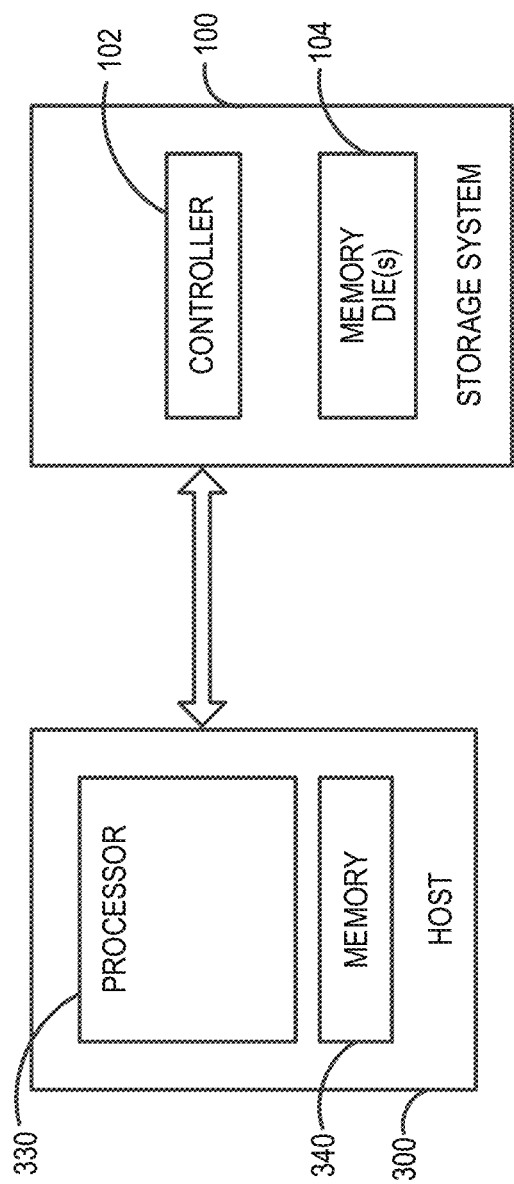
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

Figure 4:
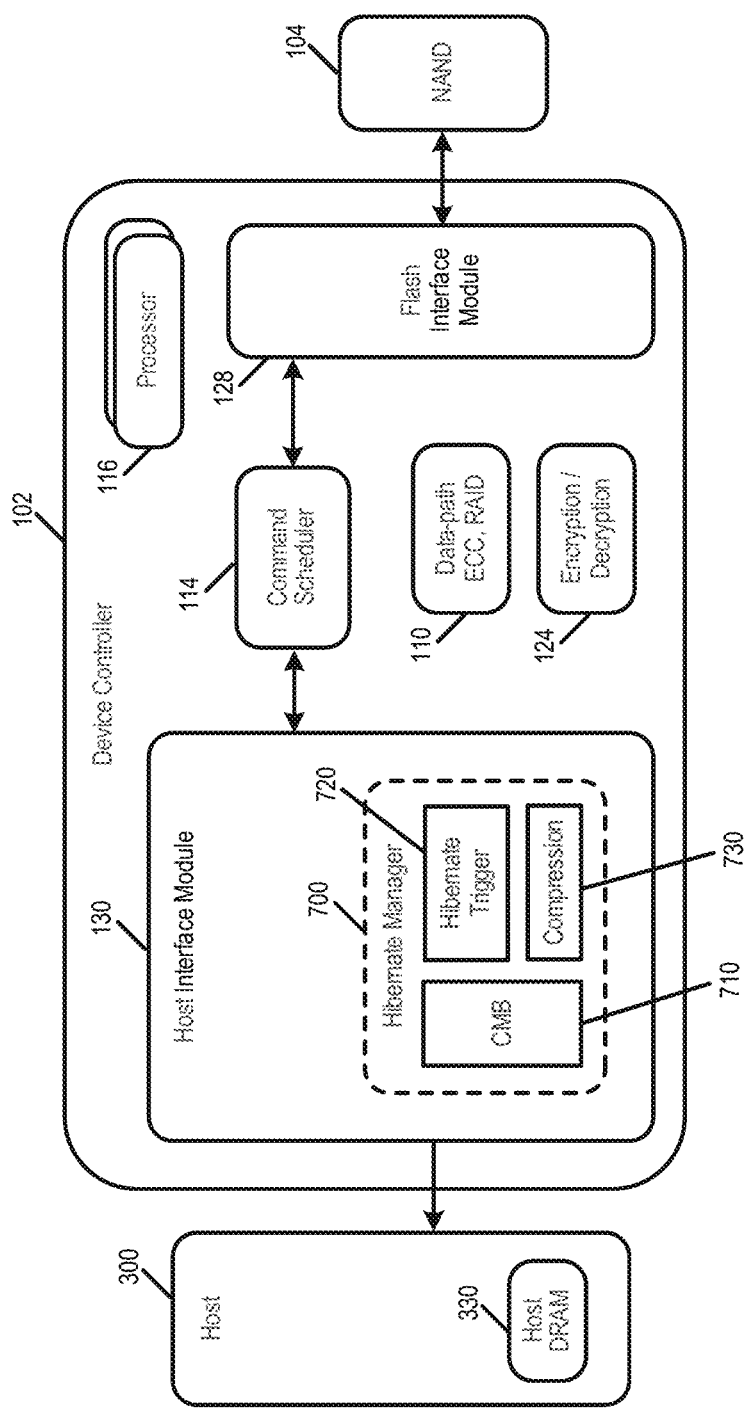
FIG. 4 is a block diagram of a data storage device of an embodiment.

FIG. 4 is another block diagram of the host 300 and components of the data storage device 100. It should be understood that this diagram is merely an example and other/fewer/more components can be used than those shown. In this example, the host 300 comprises a host DRAM 330. The controller 102 comprises a host interface module with a hibernate manager 700 that includes a controller memory buffer (CMB) 710, a hibernate trigger module 720, and a compression module 730. The controller 102 also comprises a data path 110 (here, with ECC and RAID components), a command scheduler 114, one or more processors 116, an encryption/decryption module 125, and a flash interface module 128 that communicates with the memory 104 (here, NAND).

Figure 7:
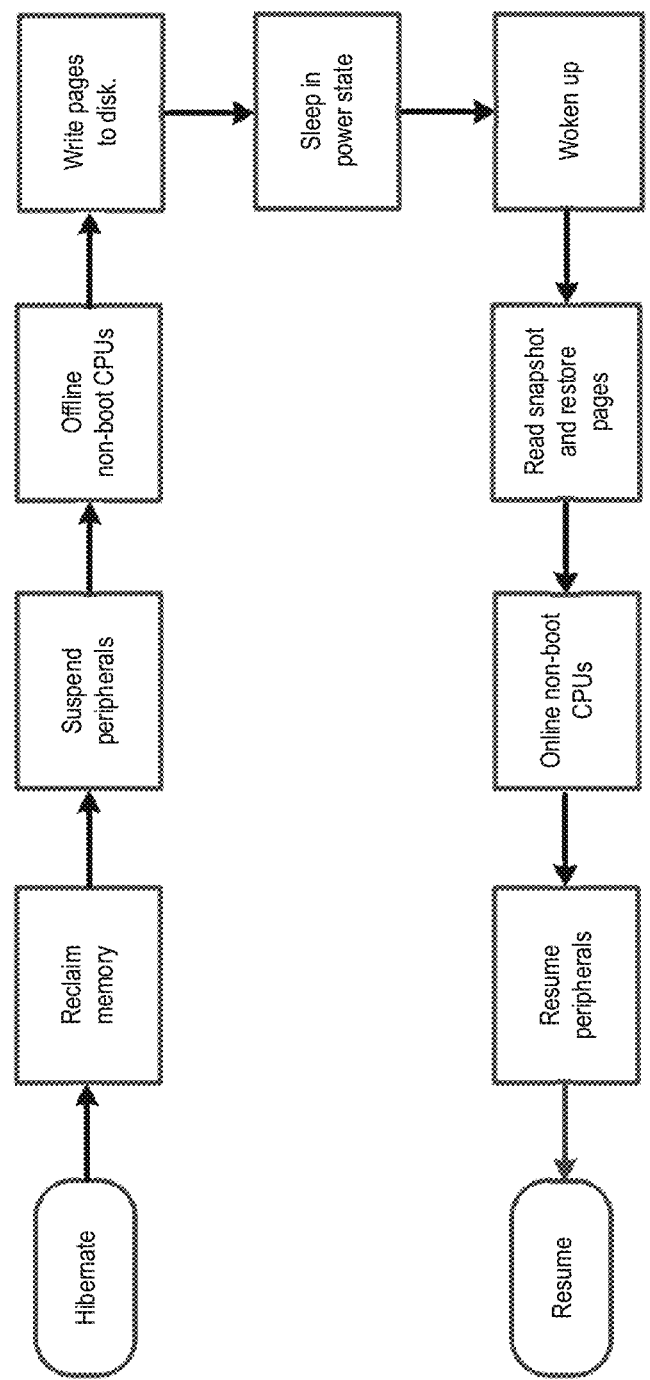
FIG. 7 is a flow chart of a prior art hibernation and resume process.

As mentioned above, some consumer host platforms include a hibernate feature that commits the entire system state of the host to a non-volatile memory in a data storage device. The system state can be read from the data storage device later when the host wakes up. The feature works by writing all of the host system memory to a file in the data storage device (the hibernate phase) and then reading that file back into the host system memory (the resume phase), allowing user activity to continue from the point of hibernation. FIG. 7 is a diagram of a prior art Linux hibernate/resume process.

There are several limitations of this hibernate process. For example, since system memory is being copied into a file, it cannot be otherwise modified while the hibernate process is running. So, the hibernate process may require a special mode from the host operating system perspective. Hibernate also requires a pre-mapped file since the file system itself cannot be modified during the hibernate process. Also, since hibernate runs in a limited operating environment, it typically cannot use most storage features that accelerate the write process. For instance, Windows hibernate uses a single queue, a single outstanding queue entry, and a fixed transfer size that is much smaller than the maximum capabilities of the data storage device. This increases the time taken to enter and exit hibernate, which is especially critical if the hibernate process is triggered by low battery power.

The following embodiments explore a number of mechanisms that allow the data storage device 100 to snapshot host memory 330 for hibernation, potentially increasing performance, reducing latency, and allowing greater power reduction during critical low-power conditions. In one embodiment, the hibernate procedure is divided into two phases: setup and execution. Setup is performed by the host 300, and execution is performed autonomously by the controller 102 of the data storage device 100 after receiving a trigger event from the host 300. Conversely, the resume process can be performed by the controller 102 of the data storage device 100 after receiving a host trigger as well.

The hibernate setup phase includes defining the logical block address (LBA) region(s) used for the hibernate file. In one embodiment, the extents covering this region are mapped into sequential write commands in a single submission queue. This queue is targeted within the data storage device's controller memory buffer (CMB) 710 (see FIG. 4) and is not executed during the setup phase. Following the end of the setup phase, the CMB 710 contains a queue with sequential write commands covering the entire host address space. A corresponding completion queue may (but is not required to) be allocated to receive status of the hibernate.

Figure 5:
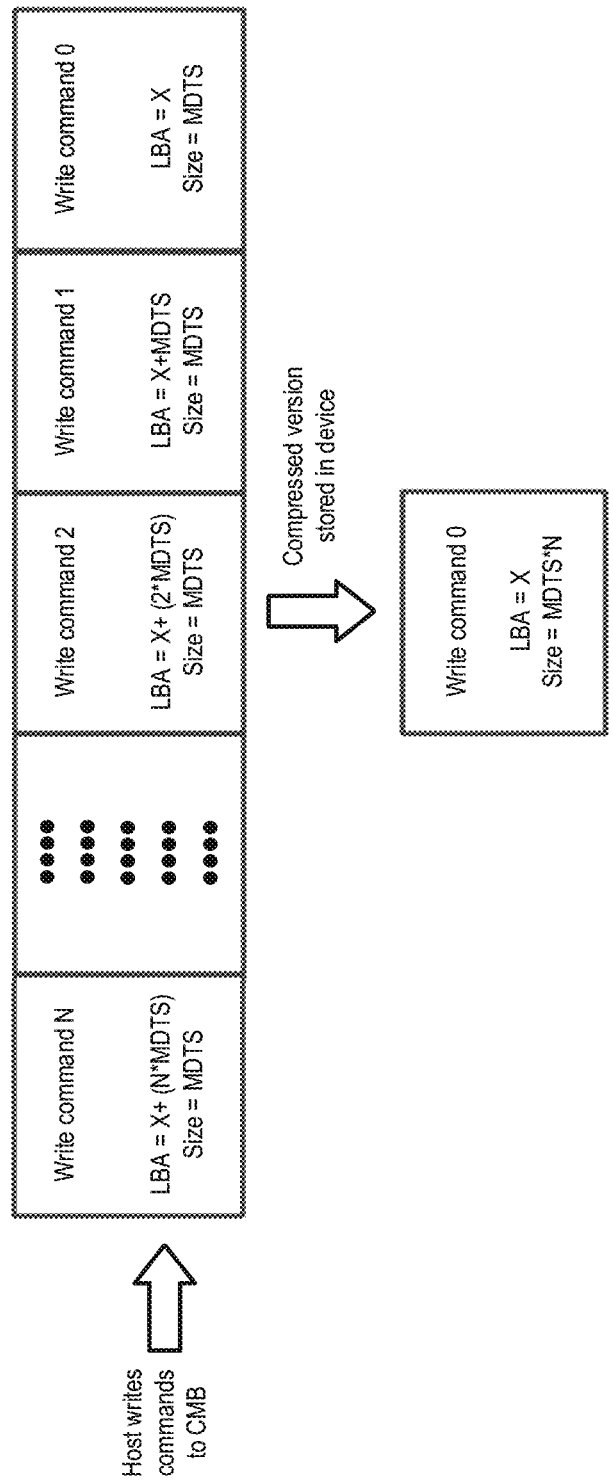
FIG. 5 is a diagram of a command compression operation performed by a controller of a data storage device of an embodiment.

In one embodiment, the regions are submitted in compressed form where a sequential range may exceed the maximum data transfer size (MDTS). In this variant, the submission queue may have a single entry spanning the entire device-visible address range. In an alternate embodiment, the compression is done by the controller 102 in the data storage device 100. The host 300 queues the commands to the CMB 710, considering the MDTS value. However, since the address ranges are sequential, the commands are compressed to a single command. FIG. 5 depicts an embodiment in which the compression is done by the controller 102 in the data storage device 100. The host 300 writes the sequential commands limited by MDTS to the CMB submission queue. The controller 102 compresses those commands and holds internally a single command that is logically equivalent to the original set of commands issued by the host 300. In some other embodiments, there might be some gaps in the memory space provided by the host 300. In this case, the commands can be still compressed using a skip mask feature (defined in NVMe TP 4128) that allows having several LBA ranges in a single write command.

In one embodiment, if, for some reason, the host 300 tries to read the commands from the CMB 710, the controller 102 can decompress the command and provide the original written commands back to the host 300. In an alternate embodiment, commands are submitted using a key per input-output (IO) feature (encryption of data on a per command basis, where each command can use a different encryption key), which allows the target hibernate file to be encrypted during the execution phase. In yet another embodiment, the submission queue is not in the CMB 710 but is copied into controller local memory using mechanisms defined in NVMe TP 4131.

With the setup phase complete, the execution phase can begin. In one embodiment, the execution phase is triggered using a command or sideband signal from the host 300. In one variant, this is triggered using a power loss notification (PLN) signal as defined in the PCI-SIG M.2 form factor specification and NVMe TP 4029. In another variant, the execution phase is triggered using an NVMe-MI command sequence or an NVMe doorbell transaction.

Once the execution phase is triggered, the queue (e.g., in the CMB 710) is executed internally by the controller 102 as if it were submitted by the host 300. However, completions are not sent to the host 300 for each command. Instead, a single completion interrupt is sent back to the host 300 once the queue is completely executed. The host 300 may then access a corresponding completion queue if one was provisioned in order to signal hibernate success. Alternatively, hibernate completion may be signaled using a sideband signal if that was the triggering mechanism.

Figure 6:
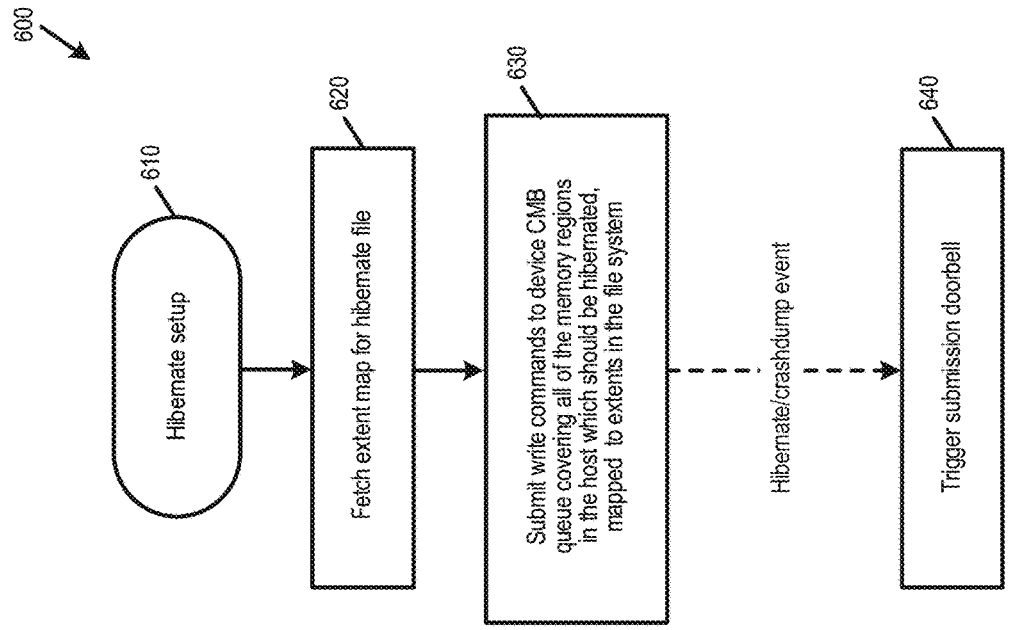
FIG. 6 is a flow chart of a method of an embodiment that illustrates hibernate setup and execution phases.

FIG. 6 is a flow chart 600 that depicts hibernate setup and execution phases of an embodiment. As shown in FIG. 6, when the host 300 enters a hibernate setup mode (act 610), the host 300 fetches an extent map for a hibernate file (act 620). The host 300 then submits write commands to the data storage device's CMB queue 710 covering all of the memory regions in the host 300 that should be hibernated, mapped to extents of the file system (act 620). After execution of the hibernate/crash dump event, the host 300 triggers a submission doorbell (act 640).

There are several advantages associated with these embodiments. For example, these embodiments allow hibernation to utilize full-device capabilities without requiring host support. These embodiments also allow hibernation even when the host CPU is shut down or frozen, as long as the PCIe root complex is operational. Further, these embodiments allow accelerated execution of the hibernate procedure.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:
1. A method comprising:
   performing the following in a host in communication with a data storage device, wherein the host comprises a volatile memory and the data storage device comprises a non-volatile memory:

mapping regions in the host's volatile memory to a plurality of sequential write commands;

sending, to the data storage device during a set-up phase of a hibernation process, the plurality of sequential write commands with a current state of the volatile memory in the host, wherein the plurality of sequential write commands are stored in a queue in the data storage device but are not executed during the set-up phase of the hibernation process, wherein data in the plurality of sequential write commands is compressed;

sending, to the data storage device, a trigger to perform an execution phase of the hibernation process to store the current state of the host's volatile memory in the non-volatile memory of the data storage device; and instructing the data storage device to execute the plurality of sequential write commands stored in the queue.

2. The method of claim 1, wherein a sequential range of the plurality of sequential write commands exceeds a maximum data transfer size of the data storage device.

3. The method of claim 1, further comprising receiving an indication from the data storage device that the plurality of sequential write commands has been executed.

4. The method of claim 3, wherein the indication is provided in a completion queue.

5. The method of claim 3, wherein the indication is provided in a sideband signal.

6. The method of claim 1, wherein the data storage device is instructed via a command.

7. The method of claim 1, wherein the data storage device is instructed via a sideband signal.

8. The method of claim 1, wherein the data storage device is instructed via a power loss notification (PLN) signal.

9. The method of claim 1, wherein the data storage device is instructed via a doorbell.

10. The method of claim 1, wherein the data storage device is instructed via a pre-determined sequence of commands.

11. A host comprising:
a volatile memory; and
a processor configured to:
  map regions in the volatile memory to a plurality of sequential write commands;
  send, to a data storage device during a set-up phase of a hibernation process, the plurality of sequential write commands with a current state of the volatile memory in the host, wherein the plurality of sequential write commands are stored in a queue in the data storage device but are not executed during the set-up phase of the hibernation process, wherein data in the plurality of sequential write commands is compressed;
  send, to the data storage device, a trigger to perform an execution phase of the hibernation process to store the current state of the host's volatile memory in the non-volatile memory of the data storage device; and
  instruct the data storage device to execute the plurality of sequential write commands stored in the queue.

12. The host of claim 11, wherein a sequential range of the plurality of sequential write commands exceeds a maximum data transfer size of the data storage device.

13. The host of claim 11, wherein the processor is further configured to receive an indication from the data storage device that the plurality of sequential write commands has been executed.

14. The host of claim 13, wherein the indication is provided in a completion queue or a sideband signal.

15. The host of claim 11, wherein the data storage device is instructed via a command.

16. The host of claim 11, wherein the data storage device is instructed via a sideband signal.

17. The host of claim 11, wherein the data storage device is instructed via a power loss notification (PLN) signal.

18. The host of claim 11, wherein the data storage device is instructed via a doorbell.

19. The host of claim 11, wherein the data storage device is instructed via a pre-determined sequence of commands.

20. A host comprising:
a volatile memory; and
means for:
  mapping regions in the volatile memory to a plurality of sequential write commands;
  sending, to the data storage device during a set-up phase of a hibernation process, the plurality of sequential write commands with a current state of the volatile memory in the host, wherein the plurality of sequential write commands are stored in a queue in the data storage device but are not executed during the set-up phase of the hibernation process, wherein data in the plurality of sequential write commands is compressed;
  sending, to the data storage device, a trigger to perform an execution phase of the hibernation process to store the current state of the host's volatile memory in the non-volatile memory of the data storage device; and
  instructing the data storage device to execute the plurality of sequential write commands stored in the queue.

* * * * *